United States Patent [19]

Medal

[11] Patent Number: 5,222,850
[45] Date of Patent: Jun. 29, 1993

[54] METHOD AND INSERT FOR CONNECTING COMPONENTS TO PLASTIC MEMBERS

[75] Inventor: James Medal, Cape Coral, Fla.

[73] Assignee: The Fastron Company, Franklin Park, Ill.

[21] Appl. No.: 887,722

[22] Filed: May 22, 1992

[51] Int. Cl.[5] .................. F16B 39/02; F16B 37/04
[52] U.S. Cl. ............................ 411/82; 411/180; 285/21; 285/915
[58] Field of Search ............... 411/178, 179, 180, 181, 411/183, 427, 429, 82, 258; 285/21, 915

[56] References Cited

U.S. PATENT DOCUMENTS

| | | | |
|---|---|---|---|
| 4,626,308 | 12/1986 | Ansell | 285/21 |
| 4,842,462 | 6/1989 | Tildesley | 411/180 |
| 4,906,313 | 3/1990 | Hill | 285/21 |
| 4,927,183 | 5/1990 | Steinmetz et al. | 285/21 |
| 4,938,314 | 7/1990 | Sitzler et al. | 411/180 |
| 4,941,788 | 7/1990 | Highfield | 411/180 |

FOREIGN PATENT DOCUMENTS 2461142  3/1981  France .................. 411/180

*Primary Examiner*—Neill R. Wilson
*Attorney, Agent, or Firm*—Fitch, Even, Tabin & Flannery

[57] ABSTRACT

Disclosed is an insert comprising a tubular plastic body having a hollow, axially extending threaded interior, and a plurality of interlocking portions preferably in the form of integrally formed plastic protrusions extending outward from the plastic body. The insert is maintained by force-fit engagement within a corresponding recess in a plastic base. Thereafter, the plastics of the body, protrusions and base are brought to a flowable condition at their interface to integrally bond the insert to the base and/or to interlock portions of the base and insert. The threaded interior of the insert remains intact during this insert bonding procedure to then accept and threadably engage with a threaded member, which may be metal or any other material. The insert may include slots therethrough at its lower end through which the plastics migrate, when the plastics are in their flowable condition, into the threaded interior of the insert and into contact with a threaded member screwed in the insert to secure the threaded member and prevent its further rotation. The plastic insert may also include a filler material which is compatible with the plastics and interacts with the plastics when they are brought to a flowable state to increase the bonding strength between the insert and the base. The metal threaded fastener may be already threaded into the insert at the time of bonding together the plastics of the insert and base so that a driving of the metal fastener into the base is eliminated.

10 Claims, 2 Drawing Sheets

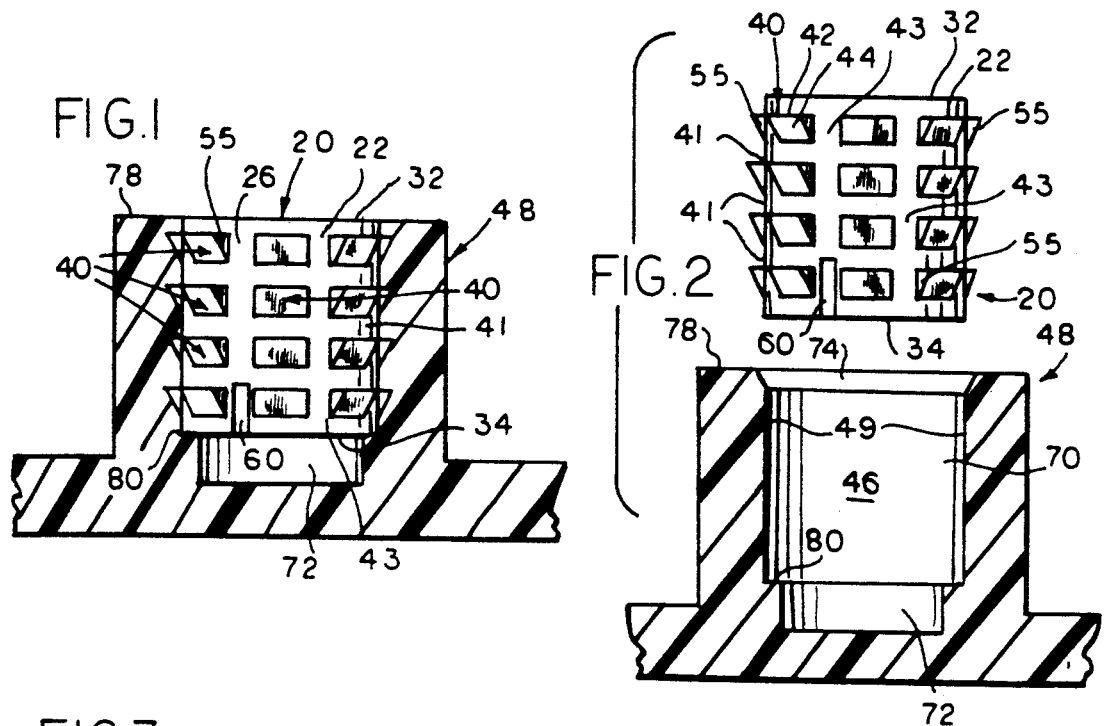
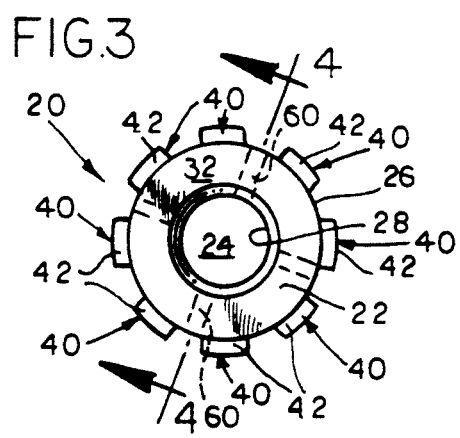
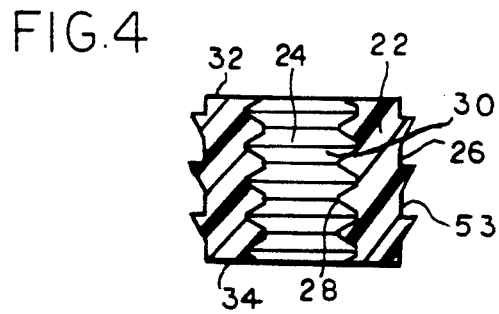
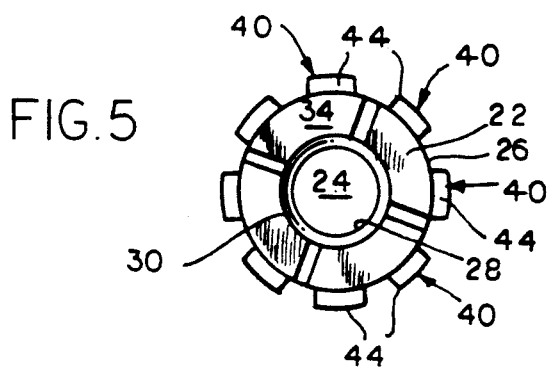

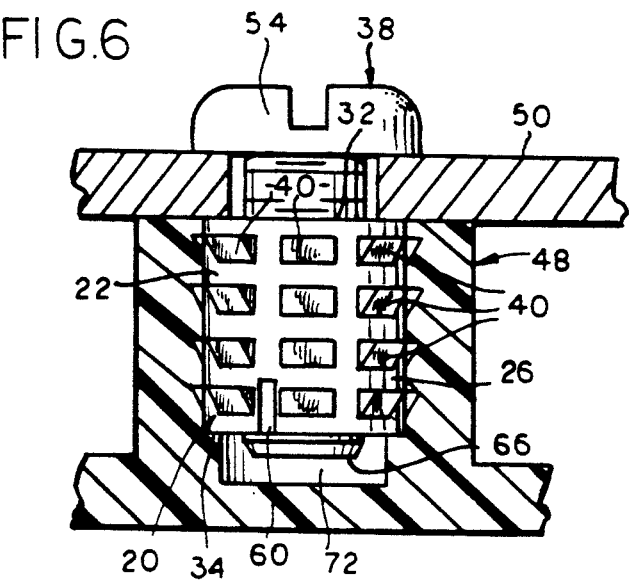
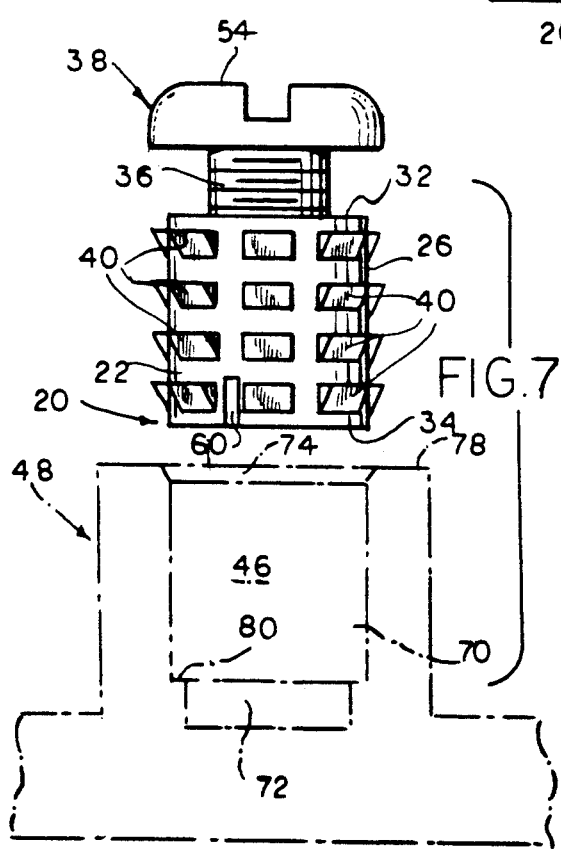
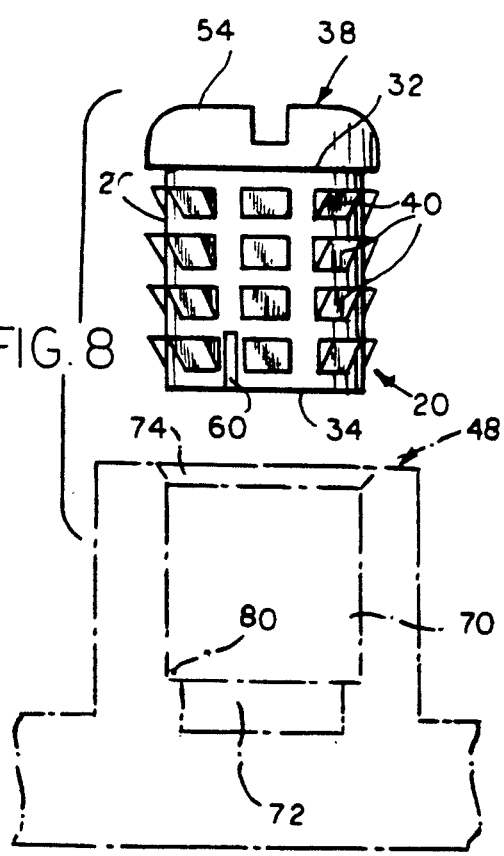

METHOD AND INSERT FOR CONNECTING COMPONENTS TO PLASTIC MEMBERS

FIELD OF THE INVENTION

The present invention pertains to a method of and assembly for providing a metallic fastener and plastic base assembly, and more particularly, relates to the use of a threaded plastic insert interlocked with the base and receiving the threaded fastener to secure a plastic component to the base.

BACKGROUND OF THE INVENTION

Molded plastic parts have becoming increasingly popular, due at least in significant part to their low production cost. Hence, often, one or more components of an assembly are formed of molded plastic. In assembling a final product it is often necessary to fasten the molded plastic parts to other components to produce the final product. Many plastic parts are molded of polycarbon or other similar material due to their high strength, however such materials also have low ductility, and it is often desirable to screw a threaded member or fastener into a molded plastic part to fasten another component thereto.

Current production methods for fastening components to a plastic part of low ductility include forming a threaded recess in the plastic part, which serves as a base, and into which a threaded member or fastener is screwed. This has been found to be undesirable in several respects. The brittle nature of polycarbon and other plastics employed makes it difficult to cut threads in the polycarbon base for receiving the threaded member. During thread formation, the brittle polycarbon base material has been found to crack and chip, often making insertion of the threaded fastener difficult or impossible. Also, the chipping reduces the bearing surface area against which the threads of the fastener bear against the base to preclude the fastener from being pulled out of the base. Thus, the load bearing capacity of the threaded member is significantly reduced.

Due to the aforementioned difficulties associated with pre-threading brittle plastic base materials, other, less desirable, fastening means have been employed. One such alternative fastening means attempted has been to employ a self-threading screw. However, the brittle nature of the plastic base material precludes the formation of a consistent thread therein, with a resultant cracking of the base.

Alternatively, internally threaded metal inserts have been molded to the base, with the threaded fastener then screwed into the internal threads of the metal insert. However, due to the inherent incompatibility of metals and plastics, the bond therebetween has been found inadequate to maintain bonding of the metal insert to the plastic base when the metal insert is pulled with significant force. Bonding of the metal insert is attained by providing the metal insert with grooves, ridges or knurls and bringing the base plastic to a flowable state whereby the base plastic flows into the grooves, ridges or knurls of the insert. Accordingly, the strength of the bond is only derived from the base plastic, and limited thereby. Hence, upon imposition of significant forces pulling on the metal insert, the insert is pulled from the base, together with any threaded member screwed into the insert. Additionally, formation of the metal inserts adds considerable expense to the overall production cost.

One method currently employed for fastening components to the base which provides the desired bonding strength is a conventional screw and nut assembly. However, this is undesirable in several respects. Functionally, the screw and nut assembly loosens over time, resulting in a loose connection between components. Also, aesthetically, screw and nut assemblies are undesirable due to the requirement of a provision for accommodating the nut or the nut being exposed on one end of the base, rather than allowing for employment of a blind tapping which provides superior aesthetics. Furthermore, the requirement of the metal nut adds undesirable cost to production.

In accordance with another aspect of the invention, there is a need for eliminating the driving of a metal fastener into the plastic base. This operation of driving the metal fastener requires assembly time and the use of labor. Overall production efficiency could be obtained by eliminating a tapping of a thread into a plastic base and/or the driving of a fastener into the thread in the plastic base. In its preferred form the invention allows elimination of the driving of the fastener into the plastic base thereby increasing overall efficiency in mounting components to a plastic base with a metal threaded fastener.

There is a need for a fastener and method of fastening components to a polycarbon or other brittle plastic base material which provides a good, secure connection capable of withstanding significant separating forces. The fastener should provide a split joinder having good aesthetic appearance and lending itself to low production cost.

Summary of the Invention

In accordance with the present invention, a ductile plastic molded insert is provided which bonds strongly, about the exterior of the insert, to a non-ductile plastic base, and the insert has internal threads for engaging with a threaded fastener such as a screw. The nature of the ductile insert is such that it lends itself to the formation of internal threads therein during molding, and also lends itself to flowing with the less ductile plastic of the base material upon being subject to ultrasound or the like, to meld with the non-ductile base plastic and integrally bond thereto. Preferably, both the plastic from the insert and from the base flow into spaces or recesses and form interlocking portions preventing rotation or axial movement of the insert relative to the base. Thereafter, a threaded member may be screwed through an aperture in a component and threadably received in the insert to attach the component to the base.

More particularly, a plastic, ductile cylindrical insert is provided having a threaded hollow interior and having a plurality of short protrusions extending radially outward from its exterior wall. A cylindrical recess is formed in the polycarbon base material, the size of which corresponds to the size of the insert. The insert is initially force-fitted into the recess with the protrusions acting as a means for holding the insert stationary during this initial setup. Thereafter, by molding, ultrasound, or the like, the plastics of the ductile insert and the non-ductile base are both brought to a flowable state at their interface, whereby they flow and meld together and thereafter cool and solidify to integrally bond the fastener to the base. In this preferred embodiment there may be spaces between the protrusions into which spaces the plastic of the base may flow to interlock with the protrusions. The internal threading of the insert remains intact during this bonding of the insert to the base, and a threaded fastener such as a screw is then screwed directly into the threaded interior of the insert.

In accordance with one embodiment of the invention, the insert has a filler of glass, metal, or the like to provide improved bonding strength. The glass or metal filler flows together with the plastics of the insert and base at their interface, creating a region about the insert of blended flowable materials, which harden to provide a region of greater strength than the original materials.

In accordance with another aspect of the invention, the bottom of the insert is provided with slots to allow flow of material from the base upon molding or ultrasound to form interlocking portions of base in the slots. The flow of plastic into the slots provides further bonding of the insert to the base. Also, if the bonding of the insert to the base is carried out with a threaded member already screwed into the insert, then when the plastic flows into the slots it contacts the lower end of the threaded member to provide a locking effect to the threaded member itself so as to prevent rotation of the threaded member. This also adds additional bonding strength to prevent the threaded member from being pulled from the base.

In accordance with still another aspect of the invention, the insert and threaded member are molded together, with the molding of the insert about the threaded member defining the interior threads of the insert. This assures an excellent thread match between the internal threads of the insert and the external threads of the threaded member. This is important in that the more perfect the thread match, the greater the area over which the forces pulling on the threaded member are distributed, and thus the more securely the threaded member is retained.

The insert lends itself to economical manufacture by conventional molding, and the method for carrying out its implementation is also low cost in comparison to alternative fastening methods.

BRIEF DESCRIPTION OF THE DRAWINGS

In the drawings, wherein like elements are referenced alike:

FIG. 1 is a side elevational view of an insert embodying various features of the present invention, shown inserted into a base recess, with the base in cross-section;

FIG. 2 is a side elevational view of the insert and cross-sectional view of the base recess of FIG. 1, shown here with the insert spaced above the base recess;

FIG. 3 is a plan view of the insert of FIG. 1;

FIG. 4 is a cross-sectional view of the insert of FIG. 1, taken along line 4—4 of FIG. 3;

FIG. 5 is a bottom view of the insert of FIG. 1;

FIG. 6 is a side elevational view of an insert inserted into a base recess, with a threaded member extending through an aperture in a component and received in the insert to fasten the component to the base;

FIG. 7 is a side elevational view of an insert having a threaded member partially inserted therein, shown spaced above a base recess which is shown in phantom; and FIG. 8 is a side elevational view of an insert having a threaded member fully inserted therein, shown spaced above a base recess which is shown in phantom.

DETAILED DESCRIPTION OF THE PREFERRED EMBODIMENTS

An insert embodying various features of the present invention is illustrated in FIGS. 1-8 and referred to generally by reference numeral 20. The insert 20 is preferably formed of ductile plastic, and preferably formed by conventional molding.

The insert 20 comprises a body 22 formed into the shape of a right circular cylinder and having an axially extending hollow interior bore or passageway 24 therethrough. The body 22 defines an exterior surface 26 and interior surface 28. The interior surface 28 is formed having threads 30 therein, extending the length of the insert 20 from its upper end 32 to its lower end 34. The internal threads 30 of the insert 20 are formed to correspond to the threads 36 of the screw or threaded member 38 (see FIG. 7) to allow the threaded member 38 to be screwed into the insert 20 and threadably engage therewith. This is discussed further, below.

A plurality of protrusions 40 are formed integral with the insert body 22 and extend radially outward from the exterior surface 26 of the insert 20. The projections 40 are preferably wedge-shaped as shown in the drawings, having a flat, generally horizontal upper end 42 and angled lower side or portion 44. The projections 40 are arranged in vertical rows with projections spaced by vertical spaces or gaps 41 (FIG. 2) from one another within a row. The rows are spaced angularly in a circumferential direction by spaces 43 between adjacent rows or projections.

The cylindrical recess 46 in the base is formed having a diameter larger than the outer diameter of the insert body 22, but smaller than the diameter defined by the outer tips of projections 40. The angled portion 44 of the wedge shaped projections 40 serves as a camming or bearing surface upon force-fit insertion of the insert 22 into a cylindrical recess 46 of a plastic base 48. Thereby, the projections 40 deflect or deform slightly during insertion of the insert 20 into the recess 46 of the base 48 so that the insert 22 is wedged in a stationary position inside the base recess 46.

Depending upon the type of plastic material selected for the insert 20 and base 48, the projections 40 of the insert 20 may burrow into the plastic of the base 48 as illustrated in the drawings, or may only scratch the wall of the base recess 46 upon insertion without digging significantly into the base material. Either way, the insert 20 remains in a stationary position by force-fit insertion within the base recess 46, with the interior threads 30 of the insert remaining intact.

After the insert 20 has been fully inserted into the recess 46, the insert 20 and base 48 are brought to a flowable state at their interface, by ultrasound or other suitable technique. Thereby, the plastic of the projections 40 flows with the plastic of the base 48 into the spaces 43 and gaps 41 about the projections 40 and plastic of the base also melts and flows into these gaps and spaces. It will be appreciated that plastic melting and flowing to rest on the upper ends 42 of the projections 40 or melting and combining with the plastic of the upper ends 42 of the projections provides a good strong barrier to upward pulling forces tending to pull the insert from the base. The plastic melting and flow into the circumferential spaces 43 between adjacent rows of projections will resist angular torque loads trying to turn or to rotate the insert in the base recess 46. That is, plastic from the internal recess wall 49 of the base and plastic from outer circumferential wall 53 (FIG. 4) as well as from outer surfaces of the projections 40 melts and flows together so that triangular shaped, vertical sides 55 on the projections abut against this melted and reformed plastic when a turning torque tries to turn the insert in the base. This creates a region of blended plastics immediately surrounding the body 22 of the insert 20. Upon cooling, the plastics solidify, with the insert 20 integrally bonded with the base 48. The interior threads 30 of the insert 20 remain intact throughout the ultrasound and cooling operations, whereby upon screwing of a threaded member 38 into the insert 20, the threads 36 of the threaded member 38 engage with the threads 30 of the insert 20 to secure the threaded member 38 within the insert 20.

Hence, the insert 20 bonds integrally with the base 48 about the exterior of the insert 20, with the interior threading 30 of the insert 20 providing a cite for threaded engagement of a screw or other threaded member 38. With brief reference to FIG. 6, to attach a component 50, which may be a metal, plastic, or any other material, to the base 48, an insert is bonded integrally to the base 48 in the aforementioned manner, and then a screw or other threaded member 38 is passed through an aperture 52 in the component 50 and screwed into the threaded interior of the insert 20. The component 50 is thus secured between the base 48 and the head 54 of the screw 38.

In accordance with one aspect of the invention, the insert 20 may include a filler of glass, metal or the like. The filler flows or migrates together with the plastics of the insert 20 and base 48 to provide increased strength to the blended region surrounding the insert 20. The filler results in greater strength because it is melted into the gaps 41 between projections and spaces 43 between rows of projections and fills at least partially these spaces and gaps and because it is at the bonding points between the insert 20 and base 48.

In accordance with another aspect of the present invention, the insert 20 has a plurality of slots 60 at its lower end 34. When brought to a flowable state, the overflow of the plastics of the base 48 and insert 20, together with any fillers, migrate into the slots 60. Upon cooling, this provides additional bonding of the insert 20 to the base 48, with small portions of plastic integral with the base 48 extending through the slots 60 to further retain the insert 20 in a stationary position. The material in the slots particularly resists turning torques trying to rotate the insert in the base.

The threaded member 38 may be short and extend only part way into the insert 20, or may be long and extend completely through the insert 20. With employment of screws or other threaded members 38 which are long enough to extend down to the slots 60, the slots 60 also serve to provide locking of the screw or other threaded member 38. Plastic flowing through the slots 60 contacts the lower end 66 of the threaded member 38, and when that plastic hardens it bears against the threaded member 38 in place, resisting rotation of the screw in the insert. If the screw 38 is already threaded into the insert at the time of plastic flow within the slots, the plastic flows against the threads and acts as an inhibitor to turning of the screw. If no screw is present at the time of plastic flow into and through the slot 60, then the screw will cut a thread into this plastic flow now projecting into the hollow bore 24 when the screw is fully threaded into the insert. The plastic in the slot and engaging the screw acts to retard any unscrewing of the screw as by vibration.

As stated previously, the present invention is particularly directed to, in its preferred embodiment, to providing a fastener 38 preassembled into the insert thereby eliminating the usual time consuming and expensive assembly operation of aligning a fastener with a threaded bore and then turning the fastener into the threaded bore. In some instances, the screw may be a self tapping screw; but nonetheless a driving operation is required. Labor can be reduced and overall efficiency can be improved by either molding the insert plastic material around the fastener 38 to provide a preassembled insert and fastener combination or by selling to a user the preassembly of the insert 26 and fastener 38 so that the fastener threading is eliminated at the place of usage of the preassembled fastener and insert assembly. A better and tighter fastener fit in the insert is obtained by molding the insert about a threaded fastener inserted into plastic mold. The plastic will fill and conform to any irregularities in the screw thread thereby resisting a turning of the screw thread in the removal direction. It will be appreciated that, where the screw thread is formed in the insert, prior to assembling the fastener therein, the tightness of the joinder of the component 50 to the base 48 is limited by the tolerances between the threads 36 of the screw 38 and the threads 30 of the insert 20. When the insert 20 is molded together with and about a threaded member 38, a perfect thread match is realized between the threads 36 of the screw or other threaded member 38 and the threads 30 of the insert 20. The threaded member 38 may be coated with a high temperature lubricant to create a barrier between the plastic insert 20 and the metal threaded member 38, to allow the threaded member 38 to rotate freely following cooling of the freshly molded insert 20.

Thus, in this embodiment, a one-piece assembly is produced, such as that illustrated in FIG. 8, having a threaded member 38 residing within an insert 20 which has been formed about the threaded member. The threads 36 of the threaded member 38 define the threads 30 of the insert 20, so that an optimal engagement therebetween is realized. The threaded-fastener-and-insert-assembly is insertable as an assembly into a corresponding recess 46 of the base 48, and bonded to the base in the aforementioned manner.

The insert 20 may be bonded to the base 48 by molding during formation of the base 48, or may be bonded to the base 48 by ultrasound after the base 48 has already been formed. This is an important feature of the invention, in that significant cost savings are realized by the ability to provide the base with a site for threaded engagement during formation of the base, rather than having to bond the insert to the base in a post-molding operation.

Bonding of the insert 20 to the base 48 during the formation of the base 48 eliminates the previously-required additional production step of first forming a base 48 having a recess 46 and then, later, affixing an insert 20 within the recess 46. By molding the insert 20 to the base 48 during formation of the base 48, significant cost savings in production are realized.

The insert 20 of the present invention also lends itself to use with attaching components to a soft, pliable base 48. The compatible, higher strength insert 20 is bonded to the soft, pliable base 48 by bringing the plastics of the insert 20 and base 48 to a flowable condition at their interface, as discussed above. The higher strength plastic of the insert 20 blends with the lower strength plastic of the base 48 to provide increased material strength for securing a threaded member 38 thereat. Accordingly, the insert 20 expands the use of such softer plastics.

The recess 46 formed in the base 48 preferably has a configuration such as that shown in FIGS. 2, 7 and 8. The illustrated recess 46 comprises two concentric cylindrical sections; intermediate section 70 of a diameter corresponding to the diameter of the insert 20, and lower section 72 of reduced diameter. The uppermost portion 74 of the recess 46 tapers outwardly or is chamfered, to provide an angled bearing surface for the projections 40 to bear against during initial insertion of the insert 20 into the recess 46. The chamfered upper end portion 74 also allows the upper end 32 of the insert 20 to lie below the plane of the upper end 78 of the portion of the base 48 surrounding the recess 46.

The provision of the reduced diameter at the lower portion 72 of the recess 46 serves as a stop to define the extent of insertion of the insert 20 by abutment of the lower end 34 of the insert 20 against the ledge 80 at the step-down. The lower portion 72 also receives any excess overflow material from the insert bonding operation. Additionally, the lower portion 72 also allows for the use of screws 38 which are longer than the insert 20, with the leading end 66 of the screw 38 extending beyond the lower end 34 of the insert 20 and being received within the lower portion 72 of the recess 46. In this manner, the same inserts 20 may be employed with varying lengths of screws 38 with the depth of the lower portion 72 being varied in relation to the length of screw 38 being employed.

What is claimed is:

1. An assembly for fastening to a component comprising:
   a non-annular base for fastening to the component, the non-annular base having a recess therein, a metallic threaded fastening member
   a hollow tubular plastic body defining an interior tubular wall and an exterior tubular wall;
   said interior tubular wall being threaded threadably engaged with said threaded fastening member;
   said exterior cylinder wall having integral plastic projections extending radially outward therefrom, the diameter of the base and protrusions corresponding with the diameter of the recess in the base for force-fit engagement of the insert within the base recess, and the plastic of the insert and the plastic of the base being compatible to integrally bond the insert to the base upon bringing the regions at the interface of the insert and base to a flowable condition;
   said threaded fastening member being threaded in the tubular plastic body and attaching the component and non-annular base to each other.

2. A plastic molded assembly in accordance with claim 1, wherein said projections are wedge shaped.

3. A plastic molded assembly in accordance with claim 1 wherein said threads of said interior cylinder wall are mirror images in shapes to the threads of the threaded fastener, said threads of the interior, cylindrical wall formed by molding the insert about the threaded fastener in the insert.

4. An assembly in accordance with claim 1 in which the metallic threaded fastening member has self-tapping threads to form a thread as it is being turned.

5. An assembly in accordance with claim 1 in which the metallic threaded fastening member is longer in length than the length of the insert.

6. A molded insert for engaging a threaded fastening member with a base having a recess, the insert comprising:
   a hollow tubular plastic body defining an interior tubular wall and an exterior tubular wall;
   said interior tubular wall being threaded to threadably engage said threaded fastening member;
   said exterior cylinder wall having integral plastic projections extending radially outward therefrom, the diameter of the base and protrusions corresponding with the diameter of the recess in the base for force-fit engagement of the insert within the base recess, and the plastic of the insert and the plastic of the base being compatible to integrally bond the insert to the base upon bringing the regions at the interface of the insert and base to a flowable condition; and
   said tubular plastic body having an upper end and a lower end, with at least one slot extending through the hollow tubular body, from the interior tubular wall to the exterior tubular wall, at the lower end of the tubular plastic body.

7. A molded insert for engaging a threaded fastening member with a base having a recess, the insert comprising:
   a hollow tubular plastic body defining an interior tubular wall and an exterior tubular wall;
   said interior tubular wall being threaded to threadably engage said threaded fastening member;
   said exterior cylinder wall having integral plastic projections extending radially outward therefrom, the diameter of the base and protrusions corresponding with the diameter of the recess in the base for force-fit engagement of the insert within the base recess, and the plastic of the insert and the plastic of the base being compatible to integrally bond the insert to the base upon bringing the regions at the interface of the insert and base to a flowable condition; and
   said insert including a filler material for flowing into the interface between the insert and base to provide improved bonding strength at the interface.

8. A plastic molded insert in accordance with claim 7 wherein said filler interacts with the plastic of the base and the plastic of the insert to increase the bonding strength between the insert and the base.

9. An insert assembly for fastening components to a plastic base having a recess, the insert assembly comprising:
   a metal threaded member having a threaded shaft;
   a molded plastic tubular body formed concentrically about said threaded shaft, with the interior portions of the plastic body adjacent the metal shaft threads having a threaded contour complementary to the threads of the metal shaft;
   said plastic tubular body having a diameter smaller than the diameter of the base recess, for slidable receipt of the insert within the recess;
   a plurality of plastic protrusions formed integral with the tubular plastic body and extending radially outward therefrom;
   said plastic tubular body, plastic protrusions, and plastic base being formed of compatible materials, with the plastics thereof bonding integrally upon being brought to a flowable state to secure the plastic insert and threadably engaged metal threaded member within the base recess; and said plastic tubular body having an upper end and a lower end, with the metal threaded member extending outward from the upper end of the plastic tubular body, and the plastic tubular body has at least one slot extending radially therethrough at its lower end.

10. An insert assembly in accordance with claim 9 wherein said metal threaded member has aa leading end, and said plastic tubular body is proportioned such that the lading end of the metal threaded member is adjacent said one or more solts upon bringing the plastics to a flowable condition, a portion of the flowable plastics migrating through said slots into contact with the threaded member to secure the threaded member.

* * * * *

UNITED STATES PATENT AND TRADEMARK OFFICE
CERTIFICATE OF CORRECTION

PATENT NO. : 5,222,850
DATED : June 29, 1993
INVENTOR(S) : James Medal

It is certified that error appears in the above-identified patent and that said Letters Patent is hereby corrected as shown below:

Column 1, line 15, change "becoming" to --become--.

Column 5, line 18, change "cite" to --site--.

Column 7, line 39, after "member" insert --;-- (semicolon).

Column 7, line 42, delete "threaded".

Signed and Sealed this

Nineteenth Day of April, 1994

Attest:

BRUCE LEHMAN

Attesting Officer

Commissioner of Patents and Trademarks